United States Patent Office 3,511,873
Patented May 12, 1970

3,511,873
N-(4-CARBOXYPHENYL)ANTHRANILIC ACID
Giampaolo Picciola, Milan, Italy, assignor to Italfarmaco
S.p.A., Milan, Italy, a corporation of Italy
No Drawing. Filed Oct. 18, 1966, Ser. No. 587,437
Claims priority, application Italy, Sept. 3, 1966,
20,206/66
Int. Cl. C07c 101/48
U.S. Cl. 260—471        5 Claims

ABSTRACT OF THE DISCLOSURE

Compounds having anti-pyretic, anti-inflammatory and analgesic activity having the structural formula:

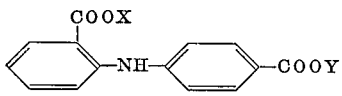

wherein X is hydrogen or an alkaline or earth-alkaline metal cation or a cation of a non-toxic organic base and Y is hydrogen or lower alkyl.

---

The present invention relates to a series of anthranilic acid derivatives having interesting pharmaco-dynamic properties such as those that are anti-pyretic, analgesic and anti-inflammatory; particularly the invention relates to compounds having general Formula I:

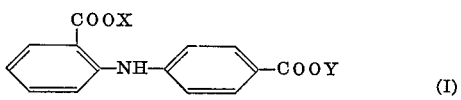

wherein X represents hydrogen or an alkaline or earth-alkaline metal cation or a cation of non-toxic organic base, particularly the β - hydroxy - ethyl - dimethylammonium cation, while Y represents hydrogen or a lower alkyl radical having 1 to 4 carbon atoms in a linear or branched chain, and a process for their preparation.

According to the invention, the compounds of general Formula I, wherein Y is different from hydrogen, are prepared by condensation of o-bromo-benzoic acid, under the form of a sodium or potassium salt, with an aromatic amine bearing in 4-position, a substituent of formula —COOY, wherein Y represents an alkyl group having 1 to 4 carbon atoms in linear or branched chain, in the presence of a Cu-containing catalyst and of a proton acceptor, in a suitable solvent, at a temperature between 75° and 150° C. N-(4-carboxyphenyl)-anthranilic acid can be obtained by hydrolysis of any of its corresponding esters.

In the preparation of the substances which are the subject of this invention, the o-bromobenzoic acid salt employed can be prepared separately, or directly in the reaction solvent, by neutralizing the acid with an alkaline carbonate, as for example, that of potassium and by distilling out the water formed.

The copper utilized as a catalyst in the condensation can be employed as a mechanically or chemically obtained powder, or as cuprous or cupric salts, as bromide or acetate. The solvent can be amyl, iso-amyl alcohol and higher alcohols, or the same proton acceptor if it is constituted by an organic base. The proton acceptor can be an alkaline metal carbonate, such as potassium carbonate, or a tertiary amine such as N-ethylmorpholine, or an aromatic amine bearing in 4-position a substituent of formula —COOY, wherein Y represents an alkyl group having 1 to 4 carbon atoms in a linear or branched chain.

The compounds according to the invention show an anti-pyretic, anti-inflammatory and analgesic activity and a low toxicity, and they can constitute useful therapeutical aids in human and veterinary medicine.

The substances according to the invention can be used as acids or as non-toxic alkaline metal or earth-alkaline metal salts, such as sodium, potassium, calcium salts or as salts of non-toxic organic bases, such as ammonium, choline, mono-, di- and tri-ethanolamine, and particularly of diethylaminoethanol. Acids and salts can be employed in the usual pharmaceutical liquid and solid forms, for use orally or by injection.

The invention is illustrated but not limited by the following examples.

EXAMPLE 1

N-(4-carboethoxyphenyl)-anthranilic acid

In a 4-necked 500 ml. reactor, there are placed 15 g. potassium o-bromo-benzoate (mol. wt. 239.13) (0.0627 mole), 20.76 g. ethyl p-aminobenzoate (mol. wt. 165.19) (0.1255 mole), 0.400 g. copper acetate, and 150 cc. amyl alcohol. The mixture is refluxed for four (4) hours. Then it is cooled, 100 ml. water is added, then the amyl alcohol is steam distilled. The residual mixture is cooled, the copper salts are filtered off, the filtrate is acidified with hydrochloric acid, extracted with ether, the ethereal extract is dehydrated and evaporated to dryness. The residue is a solid, which is recrystallized from benzene. The product obtained is 5.65 g. (yield 31.5%); M.P. 175.5–176.5° C. The product has been titrated potentiometrically in ethanol-water (1.5:1). The 1% solution in absolute ethanol shows:

Max. at 225 m$\mu$=670
Min. at 265 m$\mu$=37
Max at 344–345 m$\mu$=830
Flex. at 332 m$\mu$

EXAMPLE 2

N-(4-carbobutoxyphenyl)-anthranilic acid

In a 4-necked 500 ml. reactor there are placed 15 g. potassium o-bromobenzoate (mol. wt. 239.13) (0.627 mole), 24.259 g. butyl p-aminobenzoate (mol. wt. 193.24) (0.1255 mole), 0.400 g. copper acetate and 150 ml. amyl alcohol. The mixture is refluxed for 4 hours; then it is cooled, 100 ml. water are added, the amyl alcohol is steam-distilled off. The residual mixture is cooled, the copper salts filtered off, the filtrate is acidified with hydrochloric acid, extracted with ether, the ethereal extract is dehydrated and evaporated to dryness. The residue is an oil, which is crystallized from ligroin. The product obtained is 6.75 g. (yield 34.35%); M.P. 119.5–120.5° C. The product is titrated potentiometrically with N/10 NaOH in ethanol-water (1.5:1). The 1% solution in absolute ethanol shows the following:

Max. 225 m$\mu$=620
Min. 265 m$\mu$=29
Max. 344 m$\mu$=770
Flex. at 322 m$\mu$

EXAMPLE 3

N(-4-carbo-t-butoxyphenyl)-anthranilic acid

In a 4-necked 500 ml. round flask there are added 18.21 g. o-bromobenzoic acid (mol. wt. 201.03) (0.0906 mole), 6.3 g. K$_2$CO$_3$ (mol. wt. 138.192) (0.0453 mole), and 150 ml. amyl alcohol. The mixture is refluxed for 1 hour and 30 minutes. The H$_2$O formed is distilled off; the reaction mixture is cooled, and there are added 17.5 g. t.butyl ester of p-aminobenzoic acid (mol. wt. 193.24) (0.0906 mole) prepared according to Adams, Am. Soc. 48, 1768–69; 12.66 g. ethyl morpholine (mol. wt. 115.18) (0.11 mole), 0.800 g. Cu acetate and 50 ml.

EXAMPLE 4

N-(4-carboxyphenyl)anthranilic acid

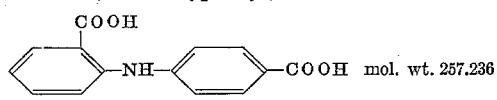 mol. wt. 257.236

N-(4-carboxyphenyl)-anthranilic acid is prepared by hydrolyzing the corresponding (in 4-position) esters. For example:

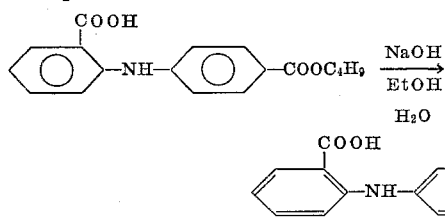

In a 500 ml. round flask there is added 20 g. N-(4-carbobutoxyphenyl)anthranilic acid (mol. wt. 313.3419) (0.06382 mole), 15 ml. ethanol, 7.895 g. 97% NaOH pellets (mol. wt. 40) (0.19146 mole) and 100 ml. $H_2O$.

The mixture is refluxed for three hours, then it is diluted with 300 ml. $H_2O$, filtered with charcoal, acidified with HCl, the precipitate filtered, washed to neutrality and up to absence of Cl ion, and dried.

The residue is re-crystallized from diethylenglycol-dimethylether, to obtain 14.8 g. of a product melting at 278–9° C. (yield 90%). Potentiometric (acidimetric) titration in dimethylformamide —$H_2O$ (1:1).

I claim:

1. A compound of formula:

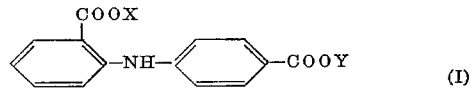 (I)

wherein X is a member selected from the group consisting of hydrogen, an alkaline metal cation, an earth-alkaline metal cation, and a cation of a non-toxic organic base, and Y is a member selected from the group consisting of hydrogen and an alkyl radical having 1 to 4 carbon atoms.

2. N-(4-carboxyphenyl)-anthranilic acid.
3. N-(4-carboethoxyphenyl)-anthranilic acid.
4. N-(4-carbo-n-butoxyphenyl)-anthranilic acid.
5. N-(4-carbo-t-butoxyphenyl)-anthranilic acid.

References Cited

UNITED STATES PATENTS 3,369,042   2/1968   Scherrer _____ 260—471

LORRAINE A. WEINBERGER, Primary Examiner

L. A. THAXTON, Assistant Examiner

U.S. Cl. X.R.

260—501.11, 518, 999